US008733825B2

(12) United States Patent
Kim et al.

(10) Patent No.: US 8,733,825 B2
(45) Date of Patent: May 27, 2014

(54) STRENGTH REINFORCEMENT DEVICE FOR FRONT SHOCK ABSORBER OF VEHICLE

(71) Applicants: Hyundai Motor Company, Seoul (KR); Kia Motors Corporation, Seoul (KR)

(72) Inventors: Jong Soo Kim, Seoul (KR); Do Hyung Kim, Incheon (KR); Jae Woo Joung, Yongin-si (KR); Joo Tae Oh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/709,954

(22) Filed: Dec. 10, 2012

(65) Prior Publication Data
US 2014/0097642 A1 Apr. 10, 2014

(30) Foreign Application Priority Data
Oct. 10, 2012 (KR) .......................... 10-2012-0112311

(51) Int. Cl.
*B62D 25/08* (2006.01)
(52) U.S. Cl.
USPC ........................................................ 296/192
(58) Field of Classification Search
USPC ........................................................ 296/192
See application file for complete search history.

(56) References Cited

U.S. PATENT DOCUMENTS

| 4,078,840 | A | * | 3/1978 | Itoh ................................ 296/192 |
| 5,927,796 | A | * | 7/1999 | Schmieder ..................... 296/192 |
| 7,766,420 | B2 | * | 8/2010 | Maruyama et al. ...... 296/203.02 |
| 2005/0179285 | A1 | * | 8/2005 | Nakajima et al. ............. 296/192 |
| 2008/0252103 | A1 | * | 10/2008 | Bechtold et al. .............. 296/192 |

FOREIGN PATENT DOCUMENTS

| JP | 4555139 | 7/2010 |
| JP | 4736669 | 5/2011 |
| KR | 10 2006 0000153 | 1/2006 |
| KR | 10-2006-0022405 A | 3/2006 |
| KR | 10 2007 0061659 A | 6/2007 |

* cited by examiner

*Primary Examiner* — Lori Lyjak
(74) *Attorney, Agent, or Firm* — Morgan, Lewis & Bockius LLP

(57) ABSTRACT

Provided is a strength reinforcement device for a front shock absorber of a vehicle to provide a sufficient supporting force in spite of a load transferred to the front shock absorber. To this end, a cowl inner lower panel and a reinforce panel which form a box-shape cross-section structure are provided and their both side end portions are integrally connected to shock absorber supporting panels. A support panel is integrally formed in front end portions of both side ends of the cowl inner lower panel to cover and be integrally connected to the front portions of the shock absorber supporting panels, thereby easily distributing the loads transferred in various directions from the shock absorber supporting panels engaged with the front shock absorbers and providing a sufficient supporting force for the shock absorber supporting panels.

6 Claims, 5 Drawing Sheets

STRENGTH REINFORCEMENT DEVICE FOR FRONT SHOCK ABSORBER OF VEHICLE

CROSS-REFERENCE TO RELATED APPLICATION

The present application claims priority of Korean Patent Application Number 10-2012-0112311 filed Oct. 10, 2012, the entire contents of which application is incorporated herein for all purposes by this reference.

BACKGROUND OF INVENTION

1. Field of Invention

The present disclosure relates to a strength reinforcement device for a front shock absorber of a vehicle, and more particularly, to a strength reinforcement device for a front shock absorber of a vehicle, which is integrally connected to a top end portion of the front shock absorber to allow a sufficient supporting force for a load transferred to the front shock absorber.

2. Description of Related Art

Generally, in a portion forming a boundary between an engine room and a front windshield glass, which is also a boundary between the engine room and a driver's seat, are provided a cowl top panel and a cowl inner lower panel. The cowl inner lower pattern has a chamber structure having a concave-groove cross-section, such that it is used as a space for installing a wiper assembly and also a space for draining rainwater and installing an air inlet of an air conditioning system.

As shown in FIG. 6, when a cowl top panel 10, which contacts a bottom end of a windshield glass, is disposed on a top portion, a cowl inner lower panel 12 is disposed under the cowl top panel 10, and shock absorber supporting panels 14 with which top ends of front shock absorbers 16 are engaged are disposed in immediately front portions from both side end portions of the cowl inner lower panel 12.

In driving of a vehicle, the front shock absorber is affected by a load exerted up and down, a load exerted to the right and to the left in turning, and a load exerted forward and backward in start and stop, and such loads are transferred to a vehicle body connected to the shock absorber and thus sensitively influence comfortableness a passenger feels in driving, on-center feel in driving, and handling performance.

Therefore, comfortableness and handling performance may be determined according to a connection structure between the shock absorber supporting panel with which the top end of the front shock absorber is engaged and its peripheral body panel.

To this end, conventionally, as shown in FIG. 6, the left and right shock absorber supporting panels 14 are integrally connected via the cowl inner lower panel 12 and a reinforce cowl inner lower panel 18 ('reinforce panel' for short).

That is, rear end portions of the left and right shock absorber supporting panels 14 are welded with front end flanges 12a of the both side end portions of the cowl inner lower panel 12 and inner end portions of the left and right shock absorber supporting panel 14 are welded with flanges 18a of both side end portions of the reinforce panel 18, such that the left and right shock absorber supporting panels 14 are integrally connected via the cowl inner lower panel 12 and the reinforce panel 18.

More specifically, the reinforce panel 18 closely contacts the surface of the cowl inner lower panel 12 and both side ends thereof are processed as the flanges 18a, such that the flanges 18a of the reinforce panel 18 are simply welded to top end edge portions of the shock absorber supporting panels 14 in closely contact manner, and thus the left and right shock absorber supporting panels 14 are integrally connected by the reinforce panel 18.

As such, since the left and right shock absorber supporting panels 14 are integrally connected and supported by the reinforce panel 18, the shock absorber supporting panels 14 may be maintained firmly without being deformed by loads exerted in various directions to the shock absorber.

However, as the cowl inner lower panel and the reinforce panel are connected merely by the flanges to the shock absorber supporting panels engaged with the front shock absorbers, such a structure is inefficient to a twisting load. In addition, there is no separate connection member in a front portion of the shock absorber supporting panel, such that the structure is not favorable to a bending phenomenon occurring due to forward and backward loads and left and right loads generated during driving.

In other words, since only the flanges of the cowl inner lower panel and the flanges of the reinforce panel are coupled, by being welded, to the shock absorber supporting panels engaged with the top ends of the front shock absorbers in a closely contact manner, a sufficient supporting force cannot be provided for up and down loads from both wheels during driving, left and right loads in turning, forward and backward loads in start and stop, and so forth.

As such, since the shock absorber supporting panel is directly affected by various loads exerted to the shock absorber, a structure in which the left and right shock absorber supporting panels are connected to each other merely by the flanges of the cowl inner lower panel and the flanges of the reinforce panel has weak strength, such that a load transferred to the shock absorber supporting panel cannot be easily distributed. As a result, the shock absorber supporting panel is deformed, the driver's comfortableness and on-center feel are poor, degrading handling stability.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the foregoing problem, and provides a strength reinforcement device for a front shock absorber of a vehicle, in which a cowl inner lower panel and a reinforce panel which form a box-type cross-section structure together are provided such that both side end portions are integrally connected to a shock absorber supporting panel, and a support panel is integrally formed in front end portions of both side ends of the cowl inner lower panel such that the support panel is integrally connected to a front portion of the shock absorber supporting panel in a way to cover the front portion of the shock absorber supporting panel, thereby easily distributing loads in various directions transferred from the shock absorber supporting panel engaged with the front shock absorber and providing a sufficient supporting force for the shock absorber support panel.

According to an aspect of the present invention, there is provided a strength reinforcement device for a front shock absorber of a vehicle, in which a reinforce panel is layered on a cowl inner lower panel to form a box-shape cross-section structure together and both side end portions which form the box-shape cross-section of the cowl inner lower panel and the reinforce panel are integrally connected to inner sides of shock absorber supporting panels.

The reinforce panel may be provided to have a "┐"-like cross-section shape and a front end portion of the cowl inner lower panel may be provided to have a "L"-like cross-section shape, such that when the reinforce panel and the cowl inner lower panel are layered on each other, they form the box-shape cross-section structure.

A support panel which is connected in a closely contact manner along circumferential surfaces of front end portions of the shock absorber supporting panels may be integrally formed in front portions from both side ends of the cowl inner lower panel.

The both side end portions which form the box-shape cross-section of the cowl inner lower panel and the reinforce panel and an inner side of the support panel may be connected to the inner sides and the circumferential surfaces of the front end portions of the shock absorber supporting panels, respectively, by welding.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
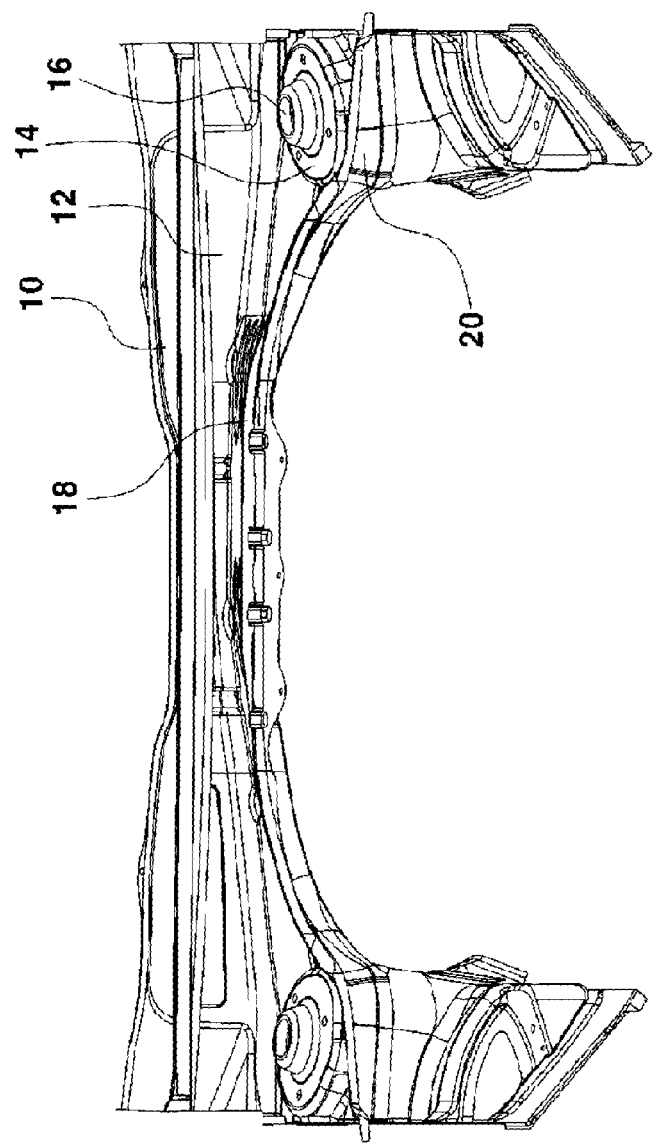
FIG. 1 is a front view of an exemplary strength reinforcement device for a front shock absorber of a vehicle according to the present invention.
Figure 2:
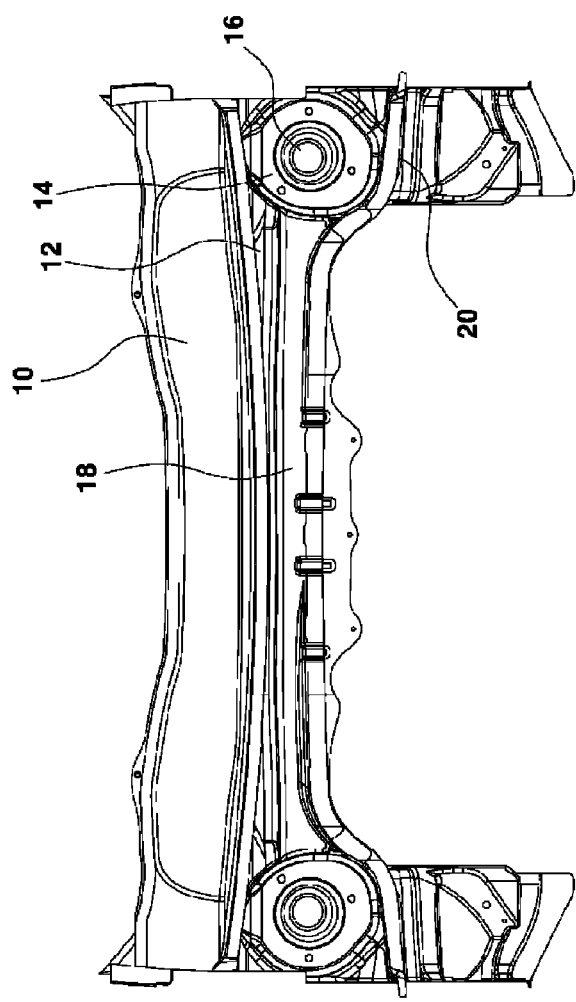
FIG. 2 is a plane view of an exemplary strength reinforcement device for a front shock absorber of a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 1 through 4, when a cowl top panel 10 contacting a bottom end of a windshield glass is disposed on a top portion, a cowl inner lower panel 12 is disposed under the cowl top panel 10, and shock absorber supporting panels 14 with which top ends of front shock absorbers 16 are engaged are disposed in immediately front portions from both side end portions of the cowl inner lower panel 12.

The present invention is intended to maintain strength in spite of loads exerted in various directions to a shock absorber during driving and at the same time, to easily distribute the loads in the various directions with a reinforcement structure for a portion integrally connected with the shock absorber supporting panels 14.

To this end, the present invention improves the cowl inner lower panel 12 integrally connected with the shock absorber supporting panels 14 and a reinforce panel 18 such that the cowl inner lower panel 12 and the reinforce panel 18 form a box-shape cross-section structure.

The reinforce panel 18 is layered on the cowl inner lower panel 12 to form the box-shape cross-section structure, and both side end portions which form the box-shaped cross-section of the cowl inner lower panel 12 and the reinforce panel 18 are integrally connected to inner sides of the shock absorber supporting panels 14 by a method such as welding or the like.

The support panel 20 integrally formed in front portions from both side ends of the cowl inner lower panel 12 closely contacts along circumferential surfaces of front end portions of the shock absorber supporting panels 14 and is integrally connected thereto by a method such as welding or the like.

Thus, the inner sides of the shock absorber supporting panels 14 with which the top end portions of the front shock absorbers 16 are engaged are integrally connected to the cowl inner lower panel 12 and the reinforce panel 18 which form the box-shape cross-section structure, and the circumferential surfaces of the front end portions of the shock absorber supporting panels 14 are integrally connected with the support panel 20, such that strength and supporting force reinforcement are performed for the shock absorber supporting panels 14.

In other words, the both side end portions which form the box-shape cross-section of the reinforce panel 18 and the cowl inner lower panel 12 are integrally connected to the inner sides of the shock absorber supporting panels 14 and at the same time, the support panel 20 is integrally connected to the shock absorber supporting panels 14 while covering the front portions of the shock absorber supporting panels 14, thereby maintaining sufficient strength and supporting force of the shock absorber supporting panels 14 for the shock absorber.

Figure 3:
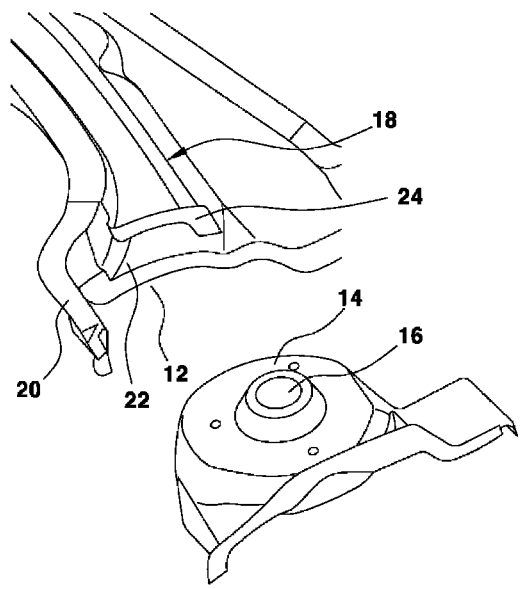
FIG. 3 is an exploded perspective view of an exemplary strength reinforcement device for a front shock absorber of a vehicle according to the present invention.
Figure 4:
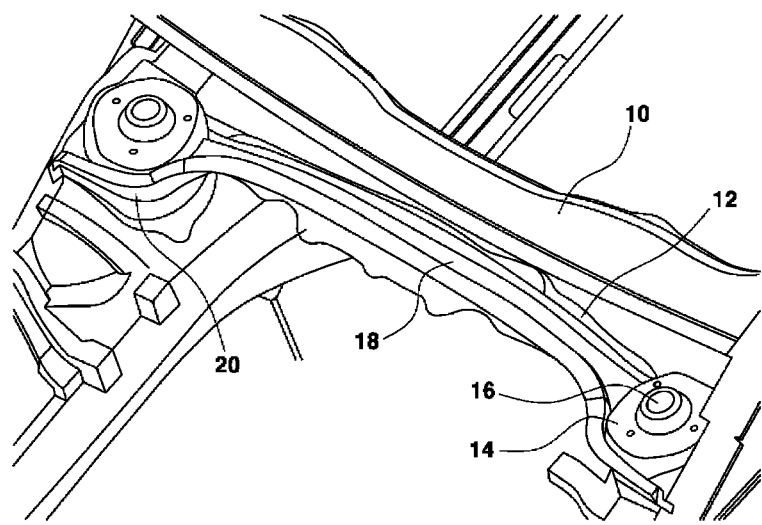
FIG. 4 is a perspective view showing a state in which an exemplary strength reinforcement device for a front shock absorber of a vehicle according to the present invention is installed.
Figure 5A:
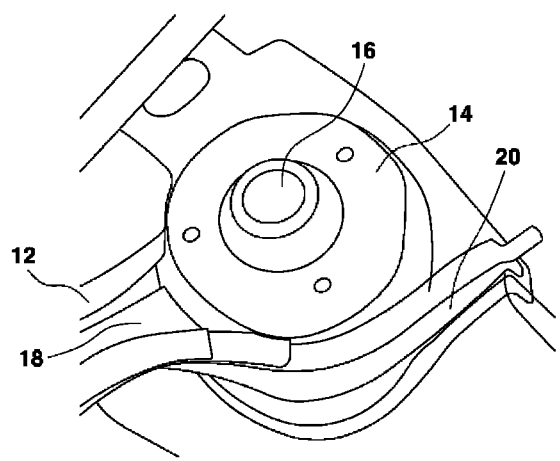
FIGS. 5A and 5B are enlarged perspective views showing a mounting structure of an exemplary strength reinforcement device for a front shock absorber of a vehicle according to the present invention.
Figure 5B:
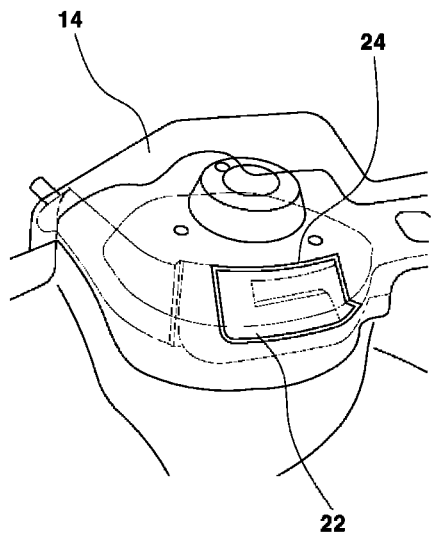
Figure 6:
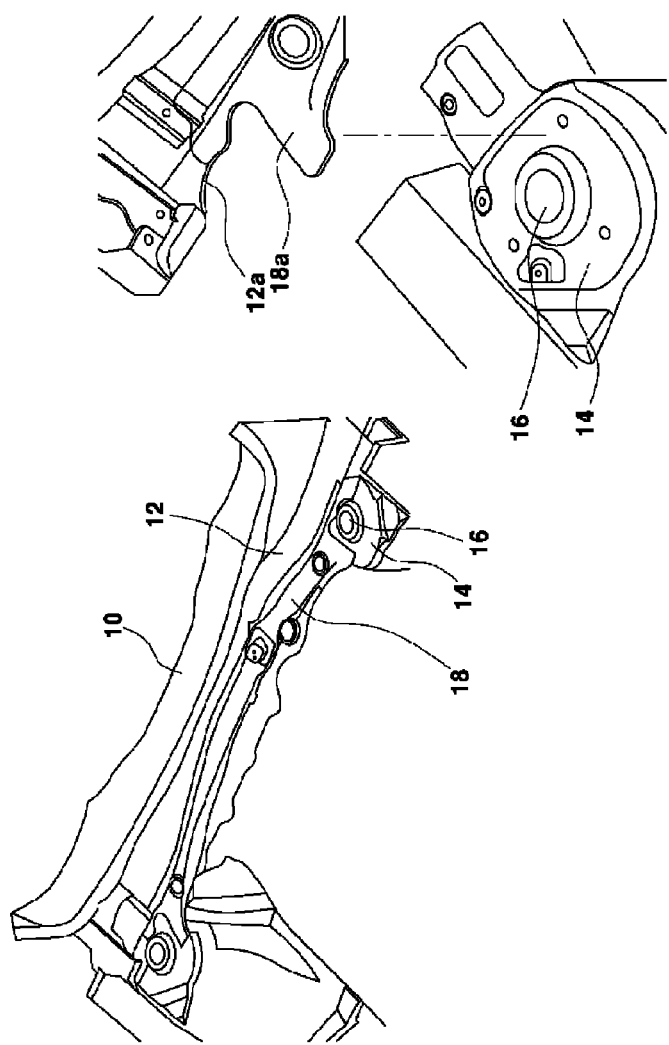
FIG. 6 is a schematic diagram showing a conventional strength reinforcement device for a front shock absorber of a vehicle.

According to various embodiments of the present invention, the reinforce panel 18 is layered on the cowl inner lower panel 12, and as can be seen in FIGS. 3 through 5, the reinforce panel 18 is provided to have a "┐"-like cross-section shape 24 and the front end portion of the cowl inner lower panel 12 is provided to have a "L"-like cross-section shape 22, such that the cowl inner lower panel 12 and the reinforce panel 18 form a box-shape cross-section structure which is favorable to strength reinforcement.

The support panel 20 extends in a curved structure from the front portions of the both side ends of the cowl inner lower panel 12 and closely contacts the circumferential surfaces of the front end portions of the shock absorber supporting panels 14, such that the support panel 20 is integrally connected in a closely contact manner to the front portions of the shock absorber supporting panels 14 by welding, thereby achieving strength and supporting force reinforcement with respect to the front portions of the shock absorber supporting panels 14.

The both side end portions of the cowl inner lower panel 12 and the reinforce panel 18 which form the box-shape cross-section structure are integrally connected to the inner sides of the shock absorber supporting panels 14, and at the same time, the support panel in the form of a curved wing is integrally formed in the cowl inner lower panel 12 and is integrally connected to the front portions of the shock absorber supporting panels 14, thereby providing sufficient strength and supporting force of the shock absorber supporting panels 14 for the shock absorber.

The support panel 20 may be provided in the shape of a C-like or semicircular flat panel to cover circumferential portions of the shock absorber supporting panels 14, thereby providing sufficient strength and supporting force of the shock absorber supporting panels 14 with respect to the shock absorber.

Moreover, the loads exerted in various directions to the front shock absorbers 16 during driving of a vehicle (up and down loads during driving, left and right loads in turning, forward and backward loads in start and stop, etc.) are easily distributed to the cowl inner lower panel 12 and the reinforce panel 18 which form the box-shape cross-section structure through the shock absorber supporting panels 14 and at the same time, to the support panel 20.

Therefore, in spite of the load exerted in various directions to the shock absorbers 16, the shock absorber supporting panels 14 maintain a strong state, and have a sufficient supporting force for the up/down, forward/backward, and twisting loads, thereby improving comfortableness a passenger feels in driving, on-center feel in driving, and handling performance.

According to the present invention described above, the following effects may be provided.

The both side end portions of the cowl inner lower panel and the reinforce panel which form a box-shape cross-section structure are integrally connected to the shock absorber supporting panels, and at the same time, the support panel in the form of a wing is integrally formed in the cowl inner lower panel to cover and be integrally connected to the front portions of the shock absorber supporting panels, thereby providing a sufficient supporting force for the shock absorber supporting panels and easily distributing the loads transferred in various directions from the shock absorber supporting panels engaged with the front shock absorbers (up and down loads during driving, left and right loads in turning, forward and backward loads in start and stop, etc.).

For convenience in explanation and accurate definition in the appended claims, the terms lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A strength reinforcement device for a front shock absorber of a vehicle, comprising:
   a reinforce panel layered on a cowl inner lower panel to form a box-shape cross-section structure together; and
   opposing side end portions forming the box-shape cross-section of the cowl inner lower panel and the reinforce panel and integrally connecting inner sides of shock absorber supporting panels.

2. The strength reinforcement device of claim 1, wherein the reinforce panel is provided to have a "⌐"-shaped cross-section and a front end portion of the cowl inner lower panel is provided to have a "∟"-shaped cross-section, such that when the reinforce panel and the cowl inner lower panel are layered on each other, they form the box-shape cross-section structure.

3. The strength reinforcement device of claim 1, wherein a support panel which is connected in a closely contact manner along circumferential surfaces of front end portions of the shock absorber supporting panels is integrally formed in front portions from both side ends of the cowl inner lower panel.

4. The strength reinforcement device of claim 1, wherein the both side end portions which form the box-shape cross-section of the cowl inner lower panel and the reinforce panel and an inner side of the support panel are connected to the inner sides and the circumferential surfaces of the front end portions of the shock absorber supporting panels, respectively, by welding.

5. The strength reinforcement device of claim 3, wherein the both side end portions which form the box-shape cross-section of the cowl inner lower panel and the reinforce panel and an inner side of the support panel are connected to the inner sides and the circumferential surfaces of the front end portions of the shock absorber supporting panels, respectively, by welding.

6. The strength reinforcement device of claim 3, wherein the support panel is provided in the shape of a C-like or semicircular flat panel to cover the shock absorber supporting panels.

* * * * *